Jan. 10, 1961   H. STEGEMANN ET AL   2,967,633
AUTOMATIC FRACTION COLLECTOR
Filed June 25, 1958   5 Sheets-Sheet 3
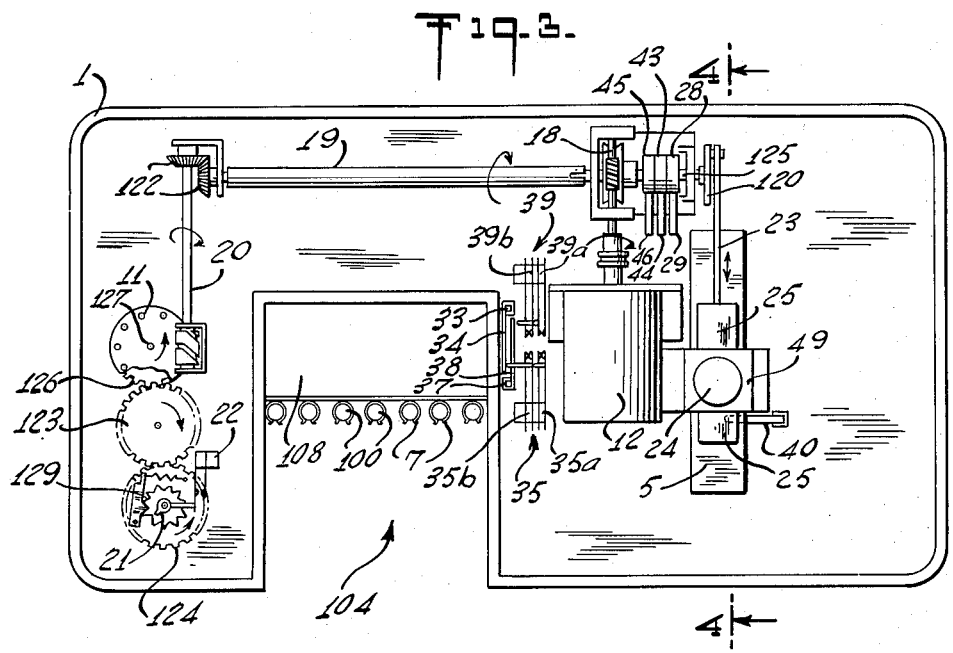
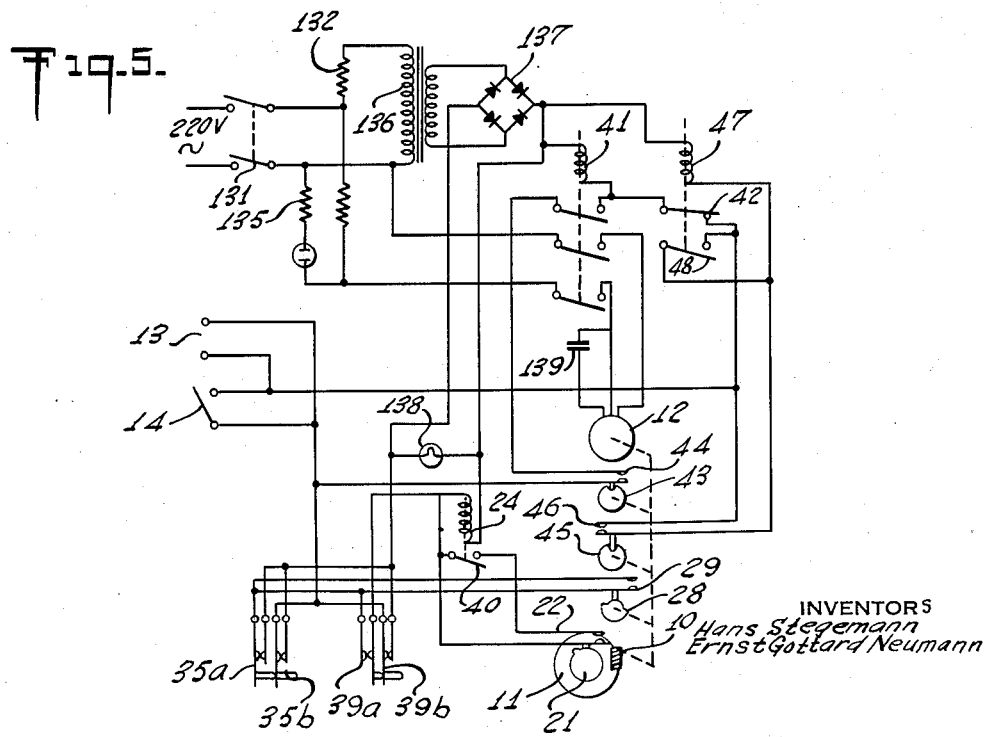
INVENTORS
Hans Stegemann
Ernst Gottard Neumann

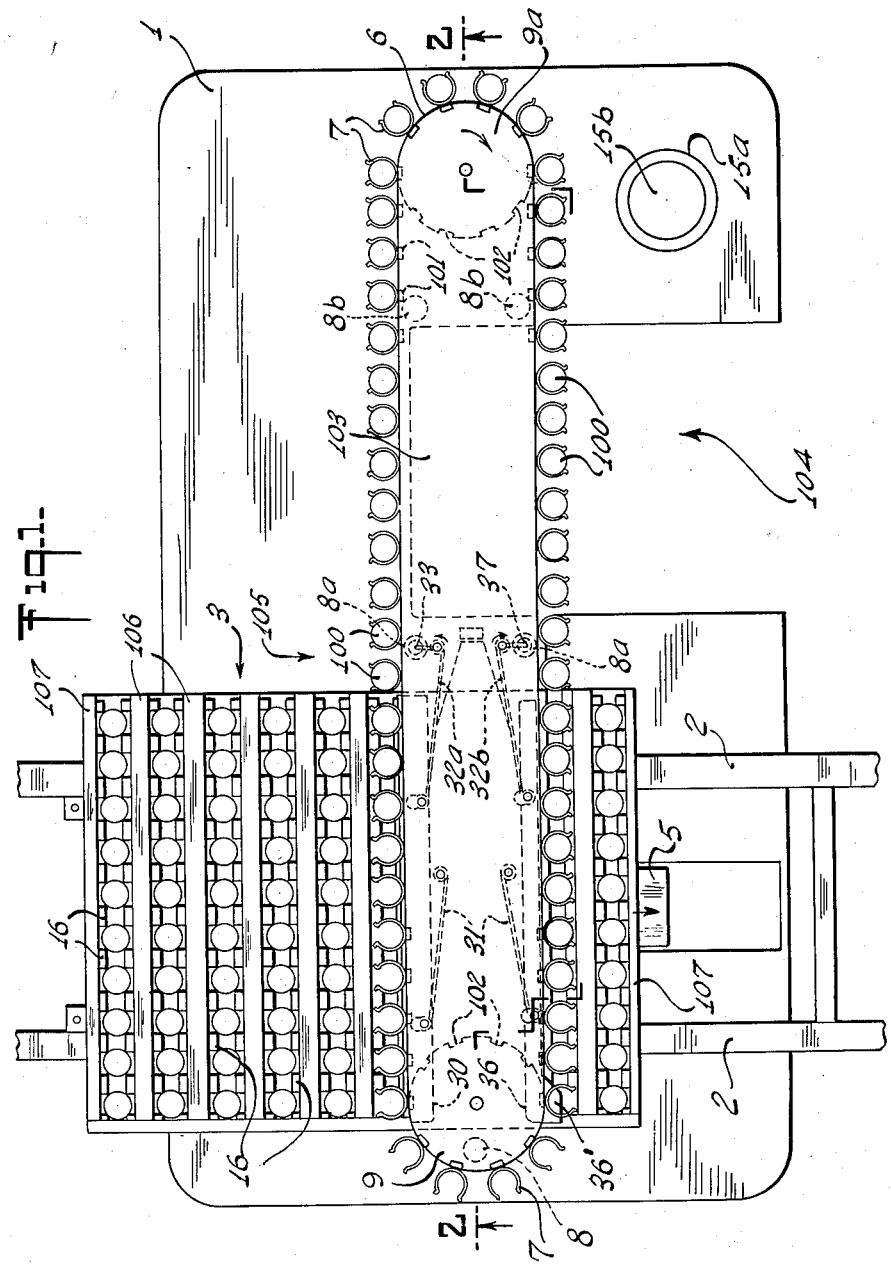

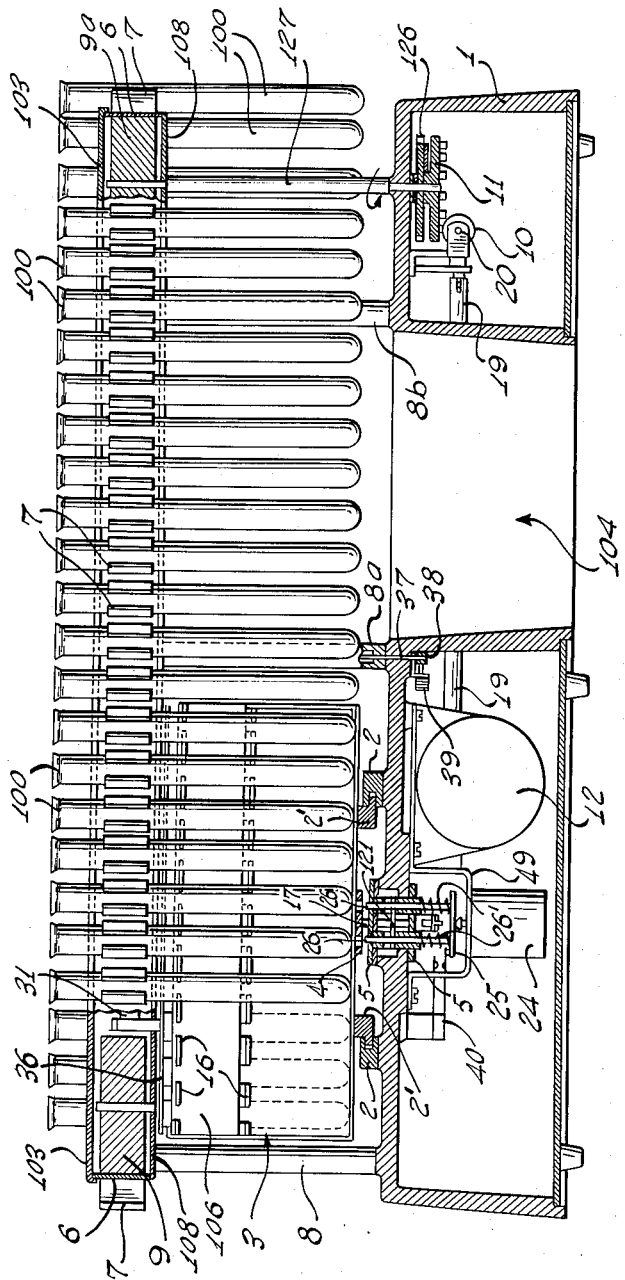

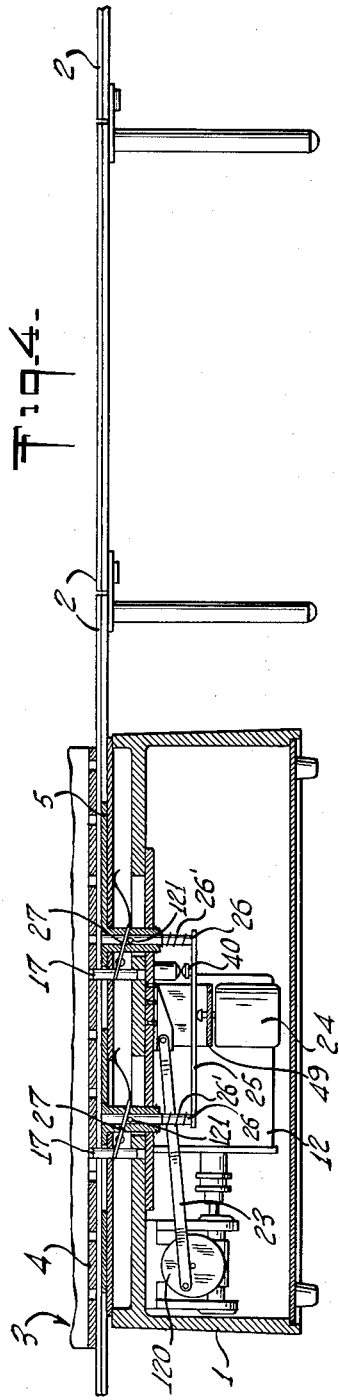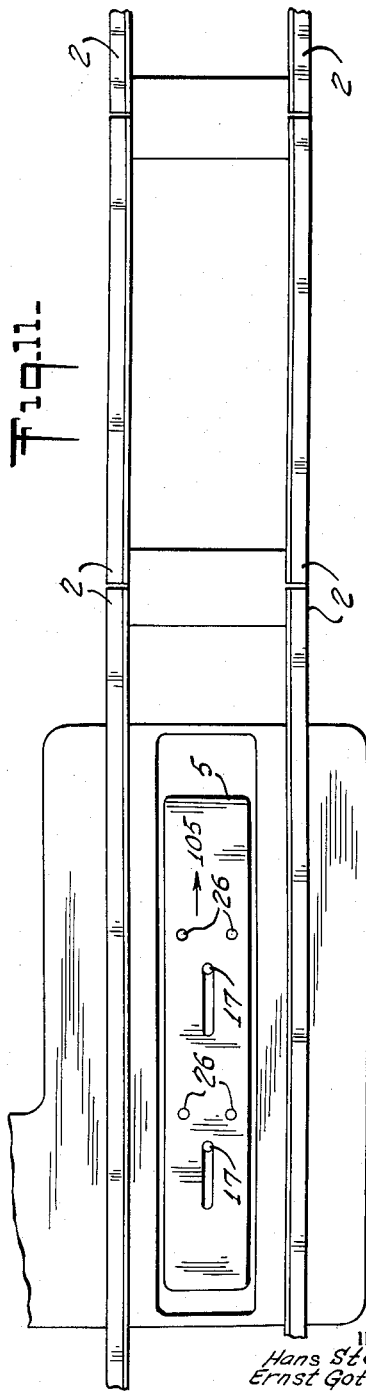

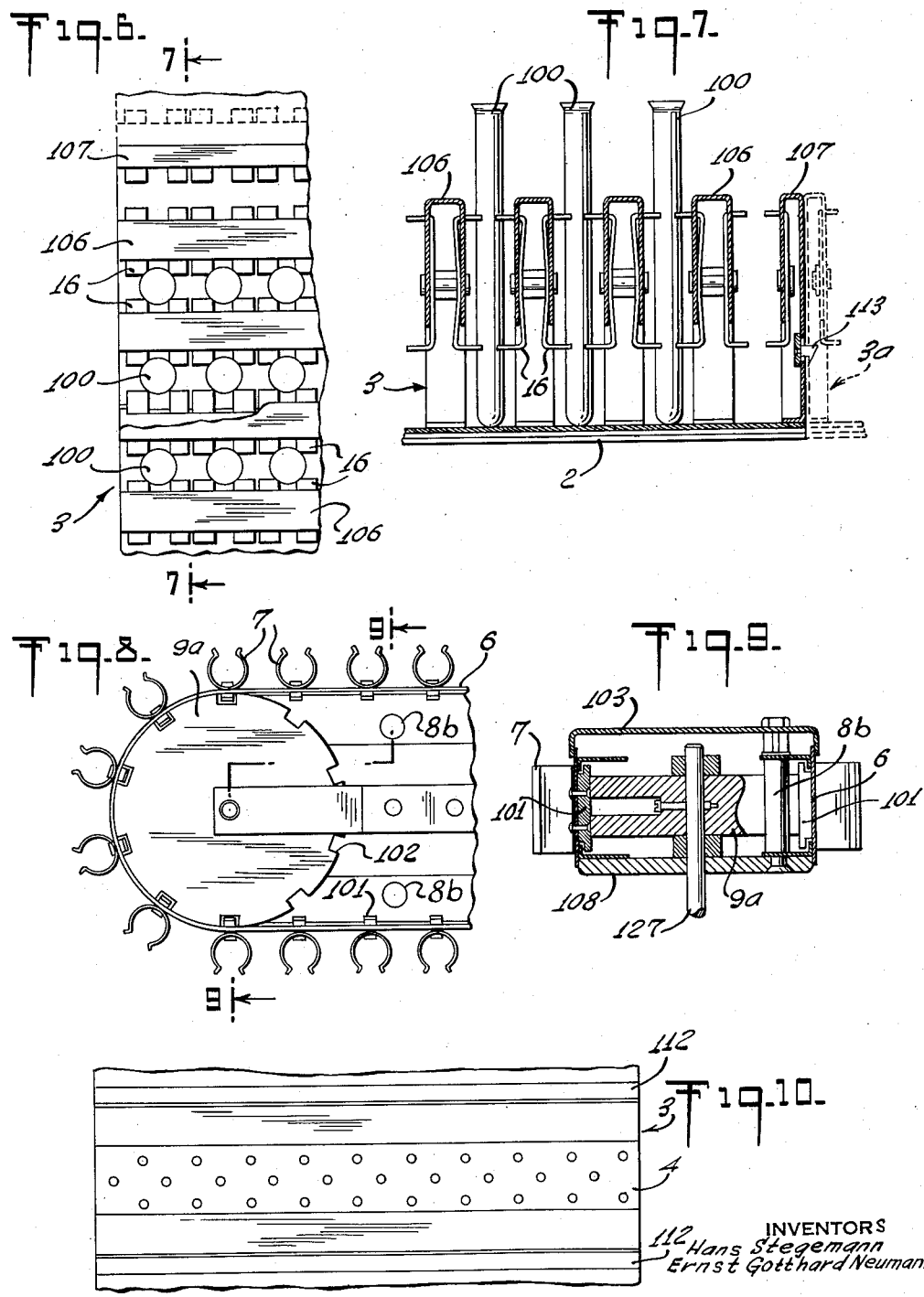

United States Patent Office 2,967,633
Patented Jan. 10, 1961

2,967,633

AUTOMATIC FRACTION COLLECTOR

Hans Stegemann, Berlin-Kopenick, and Ernst-Gotthard Neumann, Berlin, Germany, assignors to Deutsche Akademie der Wissenschaften zu Berlin, Berlin-Adlershof, Germany Filed June 25, 1958, Ser. No. 744,477

Claims priority, application Germany Aug. 5, 1957

10 Claims. (Cl. 214—309)

The invention relates to an automatic fraction collector for accepting numerous liquid fractions discharged in small amounts over a substantial period of time by chromatographic columns and similar laboratory apparatus used in fields of chemistry, biology, and medicine.

Fraction collectors available commercially comprise a horizontal circular disc carrying test tubes arranged in multiple concentric annular rows which is rotated stepwise. The pipe discharging the liquid fractions is arranged so that the location of its orifice can be varied along a radius of the disc and control means are provided whereby the discharged liquid is distributed to the test tubes in a predetermined pattern. The number of test tubes which can be stored on a disc is limited and several devices cannot be connected to cooperate automatically when numerous fractions are to be collected individually. Individual test tubes on the disc are not conveniently accessible for automatic measurement of the properties of their contents. Most devices of this type, therefore, are limited to counting drops.

It is an object of the invention to provide a fraction collector which will automatically present to the discharge pipe a practically unlimited number of test tubes.

It is another object of the invention to make these test tubes openly accessible to measuring devices of all kind promptly after they leave the charging station.

It is a more specific object of the invention to provide a fraction collector which removes test tubes in groups from a storage box for the purpose of charging them and performing measurements on the charge, and then returns the test tubes to their previous position in the storage box.

The invention in its more specific aspects contemplates to store parallel equidistant rows of equal numbers of test tubes in a box to transfer them therefrom to an endless conveyor belt moving in steps whereby they are carried past the charging station and the measuring station or other operational stations and return to the box for storage. Because of the single-file arrangement, the test tubes on the conveyor belt are accessible from all sides to inspection by suitably mounted measuring devices.

Other features and advantages of the invention will become apparent from the following detailed description of a preferred embodiment of the invention in connection with the accompanying drawings wherein:

Fig. 1 is a top plan view of a fraction collector of the invention;

Fig. 2 is a front elevation partly in section of the same device, taken on the line 2—2 of Fig. 1;

Fig. 3 is a bottom view of the device of Fig. 1 with the bottom plate removed;

Fig. 4 is an elevational section of the base of the same device taken on line 4—4 of Fig. 3;

Fig. 5 is a wiring diagram of the electrical control system of the fraction collector of the invention;

Fig. 6 is a plan detail of a portion of a storage box of Fig. 1 with receptacles used in accordance with this invention;

Fig. 7 is a sectional elevation of section 7—7' in Fig. 6;

Fig. 8 is a plan detail of a conveyor illustrated in Fig. 1 and used in accordance with this invention;

Fig. 9 is a sectional detail taken along line 9—9' of Fig. 8;

Fig. 10 is a bottom view of the storage box of Figs. 1 and 6 in accordance with this invention; and Fig. 11 is a plan view of Fig. 4.

Referring now to the drawings, wherein like reference characters designate like or corresponding parts throughout the several views, there is shown in Fig. 1 a housing 1 containing the electrical and mechanical drive and control elements. Slide rails 2 are mounted on the horizontal top surface of the housing 1 and engage mating elements 112 fastened to the bottom surface of a shallow storage box generally indicated by numeral 3 whereby the box 3 is slideably supported on the housing 1. The box shown also comprises walls 107. Movement of box 3 is actuated by a reciprocating slide 5. Broken lines in Figs. 6 and 7 indicate a second box 3a secured to box 3 by means of clasp 113 for movement therewith. Box 3 is adapted to hold ten rows of ten spaced test tubes 100 each by means of resilient holding pads 16 fastened to low partitions 106 of box 3 and arranged so that test tubes 100 are yieldingly supported and may be moved both in the direction of the rows as well as at right angle thereto against the restraining force of resilient holders 16. In the position shown, the third and fourth rows are empty, the second and fifth only partially filled. Pulleys 9 and 9a are rotatably mounted above the housing 1 by means of a platform supported by columns 8, 8a, 8b and engage an endless conveyor belt 6 at a height sufficient to clear the open top of box 3. Projections 101 of the belt engage notches 102 of pulleys 9 and 9a. The conveyor belt carries clips 7 spaced apart the same distance as the distance between the test tubes 100 in box 3. The rectilinear portions of the path of the conveyor belt 6 are spaced apart by the distance of four rows of test tubes 100 in box 3. The conveyor carries 54 clips 7, that is, enough to carry ten more than the 40 test tubes displaced by the conveyor 6 from the second to 5th rows and additional four which is the number of clips located on the curvilinear portion of conveyor 6 rounding pulley 9. Feeler bars 30 and 36 yieldingly abut against the rows of test tubes engaged simultaneously in resilient holders 16 of storage box 3 and clips 7 of conveyor 6. The side of bar 30 facing test tubes 100 is straight. Bar 36 is equipped with a camming projection 36' which is aligned with the first column of test tubes. Bars 30 and 36 are linked to pivotally mounted spring-biased levers 31, 32a, and 31, 32b respectively. Movement of levers 32a and 32b causes rotation of shafts 33 and 37 respectively. A dust cover 103 protects the pulleys 9 and 9a, feeler bars 30 and 36 and their associated elements. Setting and actuating control knobs 15a and 15b are mounted on top of housing 1. The housing is provided with a deep lateral recess generally indicated by numeral 104 over which the freshly charged test tubes 100 travel on conveyor belt 6 and where the discharge pipe of the chromatographic column or the like and measuring instruments for scanning the contents of the test tubes may be located.

Fig. 2 which shows a sectional front elevation of the device of Fig. 1, taken on line 2—2, illustrates the housing 1 carrying slide rails 2 which engage mating rails 2' fastened to the bottom of storage box 3. A reinforcing strip 4 on the bottom of box 3 is aligned with a slide 5 which is reciprocably mounted in the top surface of housing 1. Two lateral rows and one central row of perforations in strip 4 are adapted to be engaged respectively by two entraining pins 26 projectably mounted in slide 5 and biased towards the retracted position by springs 26′, and by two arresting pins 17 which are vertically reciprocable in the top of housing 1 and are actuated by means of transverse pins 121 in a manner more fully explained below.

The portion of the housing 1 located beneath the slide rails 2 fixedly holds a solenoid 24 by means of bracket 49 which solenoid when energized exerts pressure on a yoke 25 for moving pins 26 into the projecting position against the force of springs 26′. Yoke 25 also actuates a switch 40 the functioning of which will become apparent as the description of the fraction collector of the invention proceeds.

Shaft 37 which is linked to feeler bar 36 (Fig. 1) by lever 32b is axially journaled in column 8a for actuation of switch 39 by means of lever 38 as best seen in Fig. 3.

The housing 1 being of approximate U-shape, the legs of the U enclosing the recess 104, Fig. 2 shows a section of the other leg which contains the mechanism actuating the movement of the conveyor and linked to drive motor 12. Drive pulley 9a is fixedly mounted on a shaft 127 which is journaled in the platform 108 and in the top of housing 1 and which carries at its free bottom end a spur gear 126 and a pin wheel 11. The pin wheel is engaged by a worm 10 fixedly mounted on drive rod 20 which is connected to motor 12 by rod 19.

Columns 8, 8a, and 8b are mounted on top of housing 1 and support the platform 108. The shafts of pulleys 9 and 9a are journaled in platform 108. A duct cover 103 is provided above platform 108. The conveyor belt 6 travels along the edge of the space enclosed by the platform 108 and the cover 103, and the clips 7 project outwardly therefrom. Test tubes 100 are yieldably held by resilient pads 16 fastened to partition 106 in box 3. Feeler bar 36 is held in abutment against a row of test tubes by spring biased lever 31.

Fig. 3 which is a bottom view of the fraction collector of the invention after removal of the bottom plate, shows the drive motor 12 driving a reducing worm gear 18 for transmission of motive power to the conveyor belt 6 and to the storage box 3. A drive rod 19 is rotated by means of worm gear 18 in the direction of the arrow to actuate worm 10 by means of bevel gear 122 and rod 20. Worm 10 is in engagement with the pins of pin wheel 11 which is connected to the drive shaft 127 for movement of belt 6 by means of a ratchet and pawl 128. Spur gear 126 is fastened to shaft 127 and is connected to gear 124 by intermediate gear 123. Gear 124 and cam disc 21 are mounted independently on two concentric shafts which pass through the top of cover 1 and are fastened respectively to control knobs 15a and 15b (Fig. 1). Gear 124 and cam 21 are linked by a coupling formed by a ratchet wheel and pawl 129. Cam 21 closes contact 22 once during each revolution.

Worm gear 18 furthermore actuates a shaft 125 on which three timing cams 28, 43, and 45 are mounted for actuation of switches 29, 44, and 46, respectively. The free end of shaft 125 carries an eccentric 120 which is linked to slide 5 for reciprocating movement thereof by means of connecting rod 23. The supporting bracket 49 carrying the solenoid 24 straddles the slide 5 and yoke 25 attached thereto.

Shafts 33 and 37 which are linked to feeler bars 30 and 36, respectively, project into housing 1 for respective actuation by means of levers 34 and 38 of switches 35 and 39, each switch having two pairs of contacts. Switch 40 is arranged near slide 5 for actuation by yoke 25.

Fig. 4 which is a fragmentary elevational section of the device of Fig. 1 taken on line 4—4 of Fig. 3 shows the mechanism arranged inside housing 1 for translatory movement of storage box 3.

Motor 12 causes rotation of eccentric 120 which by means of connecting rod 23 reciprocates slide 5 in the top of housing 1. Entraining pins 26 being shown in the retracted position, that is, not pushed upward by solenoid 24 and yoke 25, the pins 26 do not engage the perforations in reinforcing strip 4 on the bottom of box 3, and box 3 is stationary. It is secured by arresting pins 17 which are slidably supported in the cover of housing 1 and are actuated by two-armed levers 27 connected to transverse pins 121 between pins 26 in such a manner that pins 17 move downward when pins 26 are raised by solenoid 24 and yoke 25 and vice versa, the levers 127 being spring-biased towards the lowered position of pins 17. When yoke 25 is raised by solenoid 24, it also closes the contacts of switch 40 as best seen in Fig. 2.

The wiring diagram of Fig. 5 will now be discussed together with a more detailed description of the operation of the fraction collector of the invention.

The conveyor may be started automatically by an associated measuring device which closes contact 13 or by manual operation of push button 14. The measuring device may be a drop counter which closes the contact 13 after a predetermined number of drops has fallen from a chromatographic column or other device into the test tube at the charging station. Since the measuring device can operate the starter contacts only after the first tube reaches the charging station, push button 14 or a similar device may have to be operated initially, or the conveyor may be moved manually by rotating knob 15a.

The storage box with its test tubes 100 held in resilient holders 16 is now manually put in place by sliding it along rails 2 in the direction of arrow 105 of Fig. 2 until the first row of test tubes is pushed into the clips 7 of conveyor 6. In this position the arresting pins 17 will engage the first set of recesses in the reinforcing strip 4 at the bottom of storage box 3. The motor 12 by means of gear 18, drive rod 19, bevel gear 122 and drive rod 20 actuates worm 10. During the first half turn of the worm, the associated pinwheel 11 will be indexed by one pitch spacing of the worm thereby turning pulley 9a and moving conveyor belt 6 by the distance between adjacent test tubes 100. Because the test tubes are held more firmly by clips 7 than by holders 16 in the direction of travel of the conveyor, all test tubes but one in the row are moved to the next holder and the last one moves out of the box. During the second half turn of worm 10 the conveyor belt 6 stands still.

When this process has been repeated ten times and pinwheel 11 has performed a full revolution, the conveyor belt will have cleared an entire row in box 3 of test tubes 100. Translatory movement of box 3 is then initiated by cam disc 21 closing switch 22. The position of cam disc 21 can be adjusted manually by knob 15b.

Slide 5 reciprocates because of the action of the eccentric 120 and connecting rod 23. When the solenoid 24 is energized by the closing of switch 22, the yoke 25 of the solenoid pushes the entrainment pins 26 into engagement with corresponding recesses in reinforcing strip 4 on the underside of box 3. The upward movement of pins 26 causes the arresting pins 17 to withdraw under the pressure of levers 27. The box 3 now is free to follow the next stroke of slide 5. As soon as that is completed and the box 3 has moved by the distance between two rows of test tubes, the energizing circuit of the magnet 24 is interrupted by cam 28 opening switch 29 and the entraining pins drop back, simultaneously raising the arresting pins 17 which then engage the next group of recesses in strip 4. The staggered arrangement of pins 17 and 26 has been found to improve reliability of operation.

A special safety device prevents movement of storage box 3 before all test tubes 100 have been removed from a row of holders 16. The safety device comprises a bar 30 extending over the width of storage box 3 and adapted to move while being held in a parallel position by levers 31 and 32a. If there is a single test tube left in a row, translatory movement of box 3 will cause bar 30 to be pushed back, thus moving lever 32a which will cause shaft 33 to rotate whereby switches 35a and 35b are opened. Since switch 35a interrupts the circuit of solenoid 24, the storage box 3 cannot move any further.

The movement of the storage box 3 and of conveyor belt 6 removes test tubes 100 from their holders 16 until four rows of test tubes are cleared. When this point is reached, the situation will be as follows:

The ten clips 7 standing above the fourth row of holders 16 are empty. The next 40 clips 7 each hold a test tube 100. There is therefore a row of ten clips holding test tubes 100 engaged by the first row of holders 16. On the next movement of box 3 transverse to the conveyor, these test tubes are pushed out of the openings of clips 7, the test tubes being held more firmly by the holders 16 than by the open ends of clip 7 in a direction transverse to the movement of the conveyor belt 6.

There is another safety device to make sure that all test tubes of a row are returned to their respective holders 16. This safety device comprises a bar 36 similarly arranged to bar 30 the camming projection 36' of which is pushed back only when the last test tube of a row has been inserted. Lever 32b linked to bar 36 actuates shaft 37, thus closing switch 39a which is normally open and opening 39b which is normally closed by means of lever 38 (see Figs. 3 and 5). Closing of switch 39a permits solenoid 24 to be energized by switch 29 which is actuated by cam 28 thus permitting movement of storage box 3. In order to prevent solenoid 24 to be prematurely deenergized by switch 39a which might occur by the release of bar 36 by the transverse movement of box 3, the solenoid 24 is equipped with a self-holding circuit comprising switches 40 and 29. If both bars 30 and 36 are pushed back simultaneously, the relay 41 (Fig. 5) is deenergized by switches 35b and 39b and disconnects the power supply of motor 12.

The conveyor is started by closing contacts 13 or by pressing push button 14 whereby the relay 41 is energized by a circuit including switches 35b, 39b and the holding contact 42, and motor 12 is switched on. After brief rotation switch 44 is closed by cam 43 mounted on shaft 125, thus casing relay 41 to hold itself. Shortly thereafter, switch 46 is closed by cam 45 whereby relay 47 is made to attract its armature and to open switch 42 and close switch 48 which holds relay 47 in cooperation with the external connection at 13. This assures that the transverse movement of the box 3 is terminated after a single revolution of shaft 125 even if contacts 13 should remain closed, by keeping relay 47 energized and blocking the path of current to relay 41 by open switch 42. Only after the connection between contacts 13 is opened and relay 47 is deenergized will a new closing of contacts 13 actuate relay 41.

Fig. 5 furthermore shows conventional auxiliary means for providing electric current and indicating its presence, such as main switch 131 and main fuses 132 and 133, a neon bulb 134 and its current-limiting resistor 135 to indicate main current supply. A transformer 136 and full-wave rectifier 137 with indicating lamp 138 provide direct current for the solenoid circuits. The motor 12 is shown to be of the capacitor type and is provided with starting capacitor 139.

While a storage box holding 100 test tubes in ten rows of ten tubes each has been illustrated in the above described illustrative example of an embodiment of the invention, it is apparent that the fraction collector of the invention may be modified to accommodate storage boxes holding test tubes or other suitable receptacles in straight rows of any convenient number and that the size of a box need not be limited to ten rows. The length of a storage box for a fraction collector of the invention is limited only by the length of rails 2 and these may be readily extended. We further contemplate using several storage boxes without front or end walls 107 arranged in tandem on rails 2 and linked or fastened to each other in any known manner. It will be appreciated that such an arrangement permits performing operations of extended duration and requiring the attention of an operator only at infrequent intervals when boxes of charged receptacles are removed and boxes of empty receptacles are attached.

While we have shown in the illustrated embodiment how the device of the invention can be made to supervise its own safety, we have found it convenient to connect the automatic safety devices to indicating means which draw the attention of an operator through visible or audible signals if the performance of the fraction collector is interrupted or disturbed. The additional circuits required are well known in the art and were not further illustrated in Fig. 5.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention.

What is claimed is:

1. An automatic fraction collector for selectively collecting fractions in a plurality of receptacles, comprising a housing, a storage rack movably mounted on said housing, a plurality of yieldable holder members mounted in said rack in equal spaced rows and adapted to grip the receptacles, said holder members having opening means on each side thereof in alignment with the rows for allowing movement of receptacles through said holders in the direction of said rows and preventing movement of said receptacles transverse to said rows, means on said housing for moving said rack in a direction transverse to said rows, conveyor means extending longitudinally over and across the rack and parallel to said rows, yieldable means mounted on said conveyor means for gripping said receptacles, said yieldable means having openings directed transversely to the rows on the portion of said conveyor extending over the rows for gripping said receptacles upon said rack being moved transversely to said rows and toward said yieldable means; means for moving said conveyor means in steps in a straight path so as to move said yiedable means into the path of motion of said receptacles whereby upon said rack being moved toward said yieldable means the receptacles are gripped by said yieldable means, and upon said rack being moved away from said yieldable means the receptacles are released; said means for moving said conveyor means in a straight path further removing said receptacles from the rack in the direction of said rows after said yieldable means have gripped said receptacles and placing said receptacles into said rack before releasing said receptacles.

2. An automatic fraction collector as set forth in claim 1, wherein said yieldable means for gripping said receptacles include resilient clips mounted on said conveyor means for gripping one row of receptacles while the receptacles are engaged in said holder members.

3. An automatic fraction collector as set forth in claim 1, wherein said conveyor means comprise an endless belt having straight portions parallel to the rows of holder members and extends over and across the holder members for movement past an operational station and return to said storage box in a straight line.

4. An automatic fraction collector as set forth in claim 3, wherein said yieldable means include a plurality of clips mounted on the outside of said endless belt, wherein said endless belt is mounted about a pair of axes transverse to the motion of the plane of the rows in said rack, wherein the width of the endless belt extends transversely to the plane of the rack, wherein said means for moving said conveyor means include indexing means for moving said belt an equivalent of one row of said holder members, whereby for each intermittent motion of said endless belt one row of receptacles is moved out of a row of holder members and a row of receptacles in said clips is returned into another row of holder members.

5. An automatic fraction collector as set forth in claim 4, wherein said means for moving said rack include indexing means for intermittently moving said rack a distance equal to the spacing between said rows in a direction transverse to said rows, and then stopping said rack, whereby upon each indexing movement said holder members move the receptacles placed therein by said clips a distance of one row, and bring into engagement with others of said clips the row of receptacles adjacent to the row of receptacles previously removed by others of said clips on said endless belt.

6. An automatic fraction collector as set forth in claim 5, wherein said means for moving said conveyor means and said means for moving said rack include indexing means for stopping motion after each indexing movement for a predetermined time so as to hold said receptacles in the operational station.

7. An automatic fraction collector as set forth in claim 6, wherein the distance between the clips upon one straight portion of said conveyor belt and the clips upon the other portion of said conveyor belt is equivalent to the spacing between three rows of said holder members in said rack, and wherein the number of clips on said endless belt is greater than five times the number of holder members in each row, wherein upon each indexing movement of said means for moving said conveyor means, a row of receptacles is removed from one row and returned to another row, whereby the return of said receptacles which were removed from one row of holder members is accomplished in three indexing steps of said conveyor means, wherein said rack accomplishes three indexing movements in three indexing movements of said conveyor means, wherein the length of said endless belt is sufficient to return said receptacles into said holders in three indexing steps, whereby said receptacles are returned to their identical holder members by said conveyor means.

8. In an automatic fraction collector having a housing, a storage box on said housing and reciprocatably movable with respect to said housing, a plurality of resilient holders arranged in said storage box in a plurality of straight, parallel, equidistant rows and adapted to yieldably engage an equal number of receptacles, conveyor means movably mounted on said housing, said conveyor means including an endless belt extended parallel with respect to said holders, said belt being peripherally movable with respect to said holders, a plurality of grasping means secured to said endless belt and movable therewith for juxtaposition with respect to receptacles in said holders and grasping and release thereof, first indexing means in said housing for intermittent movement of said belt, and second indexing means for movement of said storage box normal to the extended direction of said belt to a position to receive receptacles returning to said storage box by said belt.

9. In an automatic fraction collector having a housing, a storage box movable on said housing; holder means including holders in said storage box arranged in a plurality of straight, parallel, equidistant rows and adapted to yieldably engage receptacles; first pulley means rotatably mounted on said housing in the vicinity of said storage box, second pulley means rotatably mounted on said housing at a position remote from said storage box, an endless belt engaging said first and second pulley means and extending over said storage box in a line parallel to said rows of holders, a plurality of resilient grasping means secured to the outer surface of said endless belt for grasping receptacles from said holders on one extended side of said belt and releasing receptacles to holders on the other extended side of said belt, indexing means for intermittently moving one of said pulley means, index control means for moving said storage box and said holder means to a receiving position whereby receptacles removed from particular holders by said grasping means are returned to said holders by said grasping means on the other side of said belt, and guide means adapted to maintain movement of said storage box normal to the path of said belt.

10. An automatic fraction collector as set forth in claim 9, said index control means including a solenoid mechanism responsive to the movement of said belt.

References Cited in the file of this patent

UNITED STATES PATENTS

| | | |
|---|---|---|
| 1,896,639 | Meyer et al. | Feb. 7, 1933 |
| 2,138,813 | Bemis | Dec. 6, 1938 |
| 2,553,373 | Hyatt | May 15, 1951 |
| 2,596,339 | Lufkin | May 13, 1952 |
| 2,696,927 | Copping | Dec. 14, 1954 |